US009226040B2

(12) United States Patent
Niziolek

(10) Patent No.: US 9,226,040 B2
(45) Date of Patent: Dec. 29, 2015

(54) SYSTEM AND METHOD FOR CONFLICT RECOGNITION ON DISEQC PROTOCOL

(71) Applicant: ADVANCED DIGITAL BROADCAST S.A, Geneva (CH)

(72) Inventor: Jan Niziolek, Zielona Gora (PL)

(73) Assignee: ADVANCED DIGITAL BROADCAST S.A., Chambesy (CH)

( * ) Notice: Subject to any disclaimer, the term of this patent is extended or adjusted under 35 U.S.C. 154(b) by 0 days.

(21) Appl. No.: 14/517,951

(22) Filed: Oct. 20, 2014

(65) Prior Publication Data

US 2015/0113573 A1    Apr. 23, 2015

(30) Foreign Application Priority Data

Oct. 21, 2013 (EP) .................................. 13189454

(51) Int. Cl.
H04N 7/20        (2006.01)
H04N 7/18        (2006.01)
H04N 21/647      (2011.01)
H04N 21/442      (2011.01)
H04H 40/90       (2008.01)
H04N 21/61       (2011.01)
H04N 21/6371     (2011.01)

(52) U.S. Cl.
CPC ......... *H04N 21/64738* (2013.01); *H04H 40/90* (2013.01); *H04N 21/44227* (2013.01); *H04N 21/6143* (2013.01); *H04N 21/6371* (2013.01); *H04N 21/64753* (2013.01)

(58) Field of Classification Search
CPC .......... H04N 21/6143; H04N 21/6371; H04N 21/64738; H04N 21/44209; H04N 21/44227
USPC ..................................... 725/63, 68, 71, 74, 78
See application file for complete search history.

(56) References Cited

U.S. PATENT DOCUMENTS

| 7,607,155 | B2 * | 10/2009 | Bajgrowicz | H04H 40/90 725/72 |
| 8,045,916 | B2 * | 10/2011 | Wu | H04H 20/63 455/3.02 |
| 8,855,546 | B2 * | 10/2014 | Eitel | H04H 40/90 455/20 |
| 9,042,810 | B2 * | 5/2015 | Wong | H04H 20/63 342/359 |
| 2006/0174282 | A1 * | 8/2006 | Dennison | H04H 40/90 725/68 |
| 2007/0136764 | A1 * | 6/2007 | Bajgrowicz | 725/68 |
| 2008/0127277 | A1 * | 5/2008 | Kuschak | H04H 60/80 725/74 |
| 2008/0307465 | A1 * | 12/2008 | Wu | H04H 20/63 725/68 |
| 2011/0151769 | A1 * | 6/2011 | Fitzpatrick | H04H 40/90 455/3.01 |

(Continued)

FOREIGN PATENT DOCUMENTS

BE    WO 2006120203 A2 *  11/2006  .......... G06F 13/4022
DE    102008010142 A1    8/2009

*Primary Examiner* — James R Sheleheda
(74) *Attorney, Agent, or Firm* — Mark M. Friedman

(57) ABSTRACT

A method for conflict recognition on DiSEqC protocol, the method comprising the steps of generating a command to be sent to a DiSEqC device; requesting a tuner to send the command to the DiSEqC device; the method further comprises: after the step of generating the command and prior to the step of requesting a tuner to send the command, executing the following steps: sending a ODU_PowerOFF DiSEqC command from the tuner to the DiSEqC device; stopping the tuner in case the ODU_PowerOFF DiSEqC command results in unlocking the tuner; sending a "ODU_Channel_change" DiSEqC command from the tuner in order to request to retune the DiSEqC device to new parameters; assuming lack of conflict in case the tuner is locked according to the requested parameters.

5 Claims, 2 Drawing Sheets

(56) References Cited

U.S. PATENT DOCUMENTS

Figure 1:
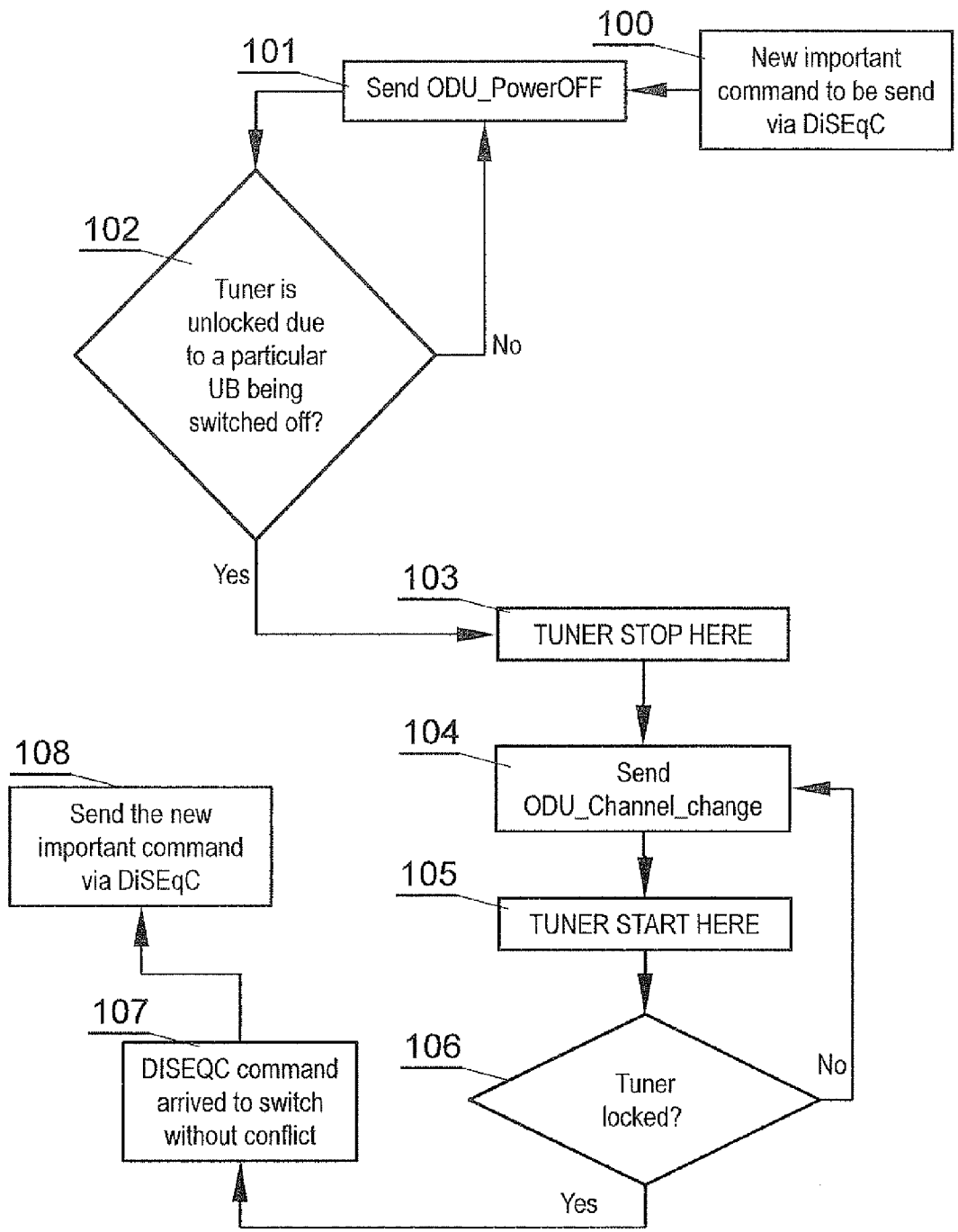

| | | | |
|---|---|---|---|
| 2012/0282870 A1* | 11/2012 | Eitel | H04H 40/90 455/150.1 |
| 2014/0118007 A1* | 5/2014 | Eitel | H04L 12/413 324/615 |
| 2014/0256246 A1* | 9/2014 | Eitan | H04H 40/90 455/3.02 |
| 2015/0015795 A1* | 1/2015 | Park et al. | 348/731 |
| 2015/0156558 A1* | 6/2015 | Anandakumar | H04N 21/64738 725/70 |
| 2015/0215681 A1* | 7/2015 | Wong | H04H 20/63 725/68 |

* cited by examiner

SYSTEM AND METHOD FOR CONFLICT RECOGNITION ON DISEQC PROTOCOL

The present invention relates to system and method for conflict recognition on DiSEqC protocol.

DiSEqC (Digital Satellite Equipment Control), is a communication protocol for use between a satellite receiver and a device such as a multi-dish switch or a small dish antenna rotor. DiSEqC was developed by Eutelsat, which now acts as the standards agency for the protocol.

A number of versions of DiSEqC exist: DiSEqC 1.0, which allows switching between up to 4 satellite sources; DiSEqC 1.1, which allows switching between up to 16 sources and DiSEqC 1.2, which allows switching between up to 16 sources, and control of a single axis satellite motor.

DISEQC protocol versions below 2 are simplex (one way) and there is not any answer from the slave device. Such a slave device may be a UNICABLE device also sometimes referred to as a "Single Cable Distribution" module, UNICABLE is a satellite television technology that enables delivery of broadcast over a single coaxial cable, and eliminates the numerous cables between the LNBs and tuners of a receiver. For example a digital video recorder comprising four tuners will be supplied with television data via a single coaxial cable and each tuner will be able to access any selected portion of the satellite band (full spectrum access for multiple receivers).

A UNICABLE module is an example of an addressable module being addressable using DISEqC commands. DiSEqC commands sequences are transmitted in series as digital words. Standard sequence words are eight bits making one byte (increasing order), followed by one parity bit (odd). The DiSEqC data command sequence contains a frame byte, an address byte and a command byte, which can be followed by a data byte.

A receiver required to operate in a single cable distribution installation can be essentially conventional. It should be able to tune to the user channel (within the normal IF tuning range) and modulate the LNB power voltage with the 22 kHz signal required for issuing DiSEqC commands. It will then require only software modification to operate as a single cable distribution receiver (source: Wikipedia).

In the UNICABLE environment, the single directional communications of DiSEqC lead to a conflict situation when two or more devices use the communication bus at the same time. As a result, no device can perform it's action correctly because the sent message will be destroyed. The message will be destroyed due to the electrical arrangement of the bus, not to the message content. The voltage levels, along with timing parameters are distorted so, the receiver is not able to decode message.

The standard EN 50494 describes several methods of determining conflict occurrence but all of them have theoretical value only.

The standard EN 50494 reads on page 21 that: " . . . . In case of DiSEqC sequence failure, the transport stream being decoded remains unchanged; this situation can be detected after a delay Tw (Twait) by different methods.
1. The absence of corrupted packet after the DiSEqC control sequence; this detection is operated at the demodulator level. Tw_max=DiSEqC sequence duration+10 ms.
2. Continuity in the PCR counter; this detection is operated in the low-level software drivers of the demultiplexer. For details, see EN ISO/IEC 13818-1. Tw_max=DiSEqC sequence duration+200 ms (PCR is refreshed every 100 ms).
3. Continuity in the transport_stream_id value. Tw_max=DiSEqC sequence duration+1 000 ms (500 ms maximum duration between SI information carrying the transport_stream_id) . . . ."

The disadvantage of the first of the above methods is that the method is not deterministic (i.e. given the same conditions, nothing else may happen). A corrupted packet may arrive at any time, due to any reason that may also be not predictable (a storm distorting the signal from satellite, a bird sitting on converter etc).

For the same reasons the second standard method is not suitable for coping with conflicts in a DiSEqC plus UNICABLE (or another DiSEqC receiver) environment or in general an environment with at least two devices sending DiSEqC commands.

The third suggested method turns out to be very slow and requires one second extra in order to check if a tuner is locked. It is unacceptable to a consumer to have a maximal recovery time of 7 attempts (as required by the standard)*(1 sec in order to check required PAT/PMT+0.5 sec for tuner locking+0.5 sec . . . plus 1 sec of a random delay between the attempts (as required by the standard))=7*(2 . . . 2.5 sec)=14 . . . 17.5 seconds for maximal recovery time.

The method according to the third option also leads to dependencies between otherwise independent software modules. The software module which services all tuner actions would depend on PSI (Program-specific information) module which collects parameters from the stream. Obviously, a PSI module can collect data only when tuner is locked, otherwise it cannot. Now there would be a loop created in order to check if the DISEQC command arrived properly to the UNICABLE switch tuner module would use it's client module. Of course it's possible to write software in such a way but both modules must be present in all system/software configurations to achieve full tuner functionality available.

It would be thus desirable to provide an improved method and system for conflict recognition on DiSEqC protocol. Preferably such method and system shall allow quick recovery and not lead to recovery times as long as 17.5 seconds suggested by the DiSEqC standard.

The object of the present invention is a method for conflict recognition on DiSEqC protocol, the method comprising the steps of: generating a command to be sent to a DiSEqC device; requesting a tuner to send the command to the DiSEqC device; the method further comprising: after the step of generating the command and prior to the step of requesting a tuner to send the command, executing the following steps: sending a ODU_PowerOFF DiSEqC command from the tuner to the DiSEqC device; stopping the tuner in case the ODU_PowerOFF DiSEqC command results in unlocking the tuner; sending a "ODU_Channel_change" DiSEqC command from the tuner in order to request to retune the DiSEqC device to new parameters; assuming lack of conflict in case the tuner is locked according to the requested parameters.

Preferably, in case the tuner fails to lock according to the requested parameters, executing another attempt of sending a "ODU_Channel_change" DiSEqC command from the tuner in order to request to retune the DiSEqC device to new parameters.

Preferably, in case the tuner fails to unlock, executing another attempt of sending a ODU_PowerOFF DiSEqC command from the tuner to the DiSEqC device.

Another object of the present invention is a system for conflict recognition on DiSEqC protocol, the system comprising: a tuner configured to send a DiSEqC command to a device responding to DiSEqC protocol commands; a DiSEqC command generator for generating a DiSEqC command to be provided to the device responding to DiSEqC protocol commands; the system further comprising: a DiSEqC conflict detector, receiving the generated DiSEqC command from the DiSEqC command generator, the DiSEqC conflict detector being configured to: send a ODU_PowerOFF DiSEqC command from the tuner to the DiSEqC device; stop the tuner in case the ODU_PowerOFF DiSEqC command results in unlocking the tuner; send a "ODU_Channel_change" DiSEqC command from the tuner in order to request to retune the DiSEqC device to new parameters; assume lack of conflict in case the tuner is locked according to the requested parameters, and request the tuner to send the generated DiSEqC command to the DiSEqC device.

Another object of the present invention is a computer program comprising program code means for performing all the steps of the method according to the present invention when said program is run on a computer.

Another object of the present invention is a computer readable medium storing computer-executable instructions performing all the steps of the method according to the present invention when executed on a computer.

Figure 2:
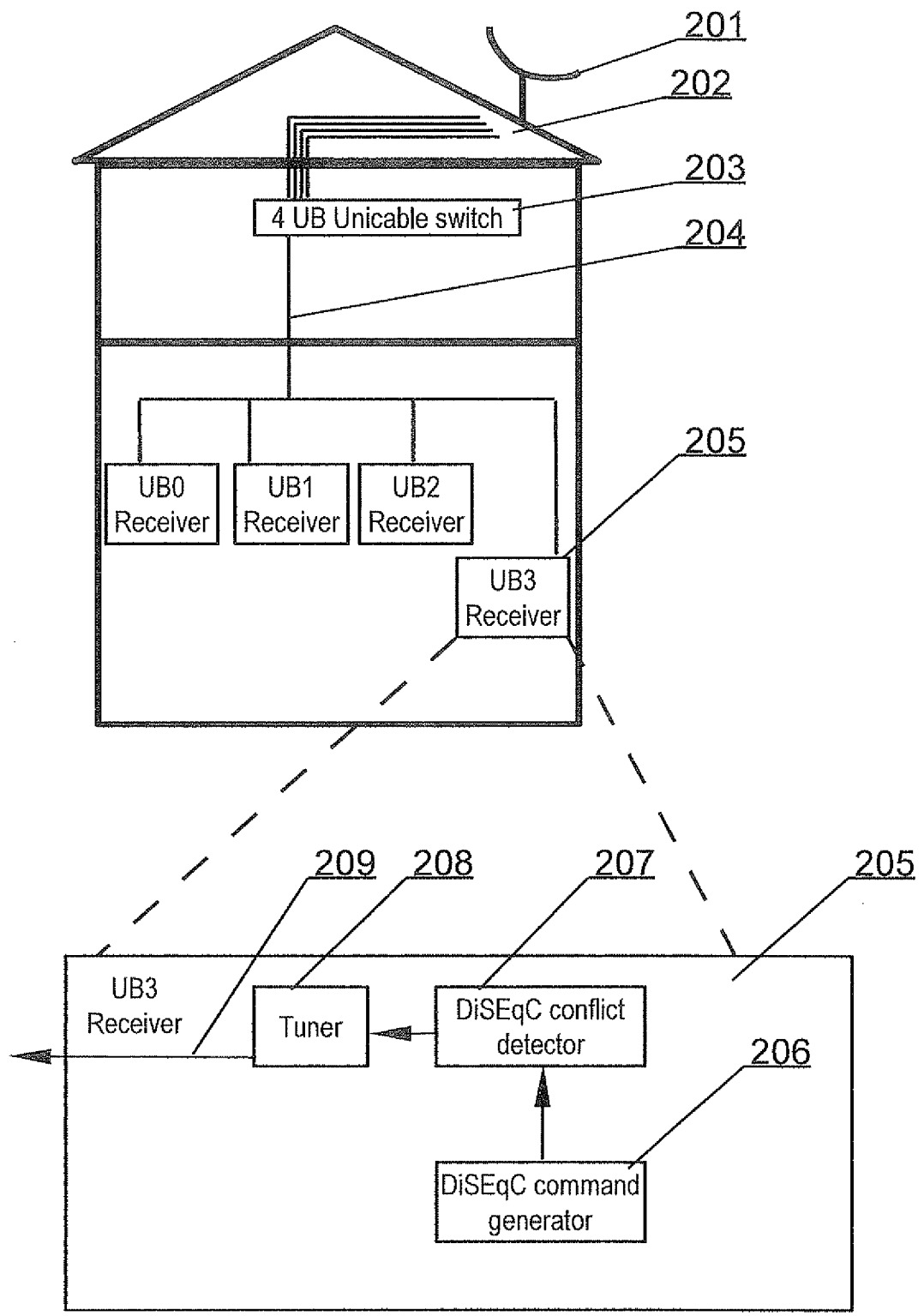

The present invention is shown by means of exemplary embodiments on a drawing, in which:

FIG. 1 presents a schematic diagram of a method according to the present invention;

FIG. 2 presents the system according to the present invention.

FIG. 1 presents a schematic diagram of a method according to the present invention. It applied a specific timing and arrangement of known DiSEqC commands that are in particular:

| ODU_ChannelChange | E0 10 5A channel_byte1 channel_byte2 |
| ODU_PowerOFF | E0 10 5A 00 poweroff_byte |

The "ODU_Channel_change" is used to request to retune a switch to new parameters, while the "ODU_PowerOFF" is used to indicate that a given User Band (UB) frequency may be switched off because the receiver (such as a set-top box) is entering standby or power off state.

The above commands are used to determine whether a DISEQC message reached its destination properly ie. a conflict situation has not occurred.

These two particular commands are selected due to the fact that the tuner is the only standard circuit present in a satellite signal receiver that may detect whether a change has occurred in the system in response to an issued DiSEqC command. Both commands are sent via one way DISEQC interface, without any return information available.

The method starts at step 100 from determining a new important command to be sent to a DiSEqC device (in practice in most cases such device is a UNICABLE switch) from a tuner for which the risk of its failed delivery is to be minimized. Next, at step 101, the method proceeds to sending the ODU_PowerOFF command from a given tuner to the UNICABLE switch (Typically the ODU_PowerOFF, as defined in the EN50494 standard, will be sent to a UNICABLE switch but may be sent to any DiSEqC device) in order to switch off an UB assigned to the given tuner.

In case step 101 does not result in unlocking the tuner due to a particular UB being switched off 102, the method returns to attempting another try of step 101. Otherwise, when step 101 does result in unlocking the tuner due to a particular UB being switched off 102, the method proceeds to step 103 where the tuner is stopped.

Subsequently, at step 104 of the process, the "ODU_Channel_change" command is used to request to retune a switch to new parameters, which starts the tuner at step 105. If the tuner is appropriately locked to the same UB (this means that the command arrived without conflict and data arrive from new channel) 106, the system assumes 107 that the DiSEqC commands arrived correctly and there is a low likelihood that a conflict exists with another device sending DiSEqC commands (for example another TV signal receiver, being DiSEqC commands generator, communicating with a UNICABLE, switch being DiSEqc commands receiver).

In case step 106 results in a failure, the system returns to step 104 and retries executing the "ODU_Channel_change" command because the likelihood that a conflict occurred is high and the command selected at step 100 is likely to fail.

Only when step 107 has been executed, the command selected at step 100 may be send 108 via the DiSEqC protocol (ie. The tuner is requested to transmit such command). At this time the likelihood that the command will be successful is determined as high.

The presented method proves very efficient in comparison to the known methods because the time required for its execution, and in the end determination whether a likelihood of a DiSEqC conflict and command failure is high, is in the range of hundreds of milliseconds up to 1 second (some time is required to lock tuner again, or to determine if tuner can't be locked, these times may vary from system to system due to the different hardware and tuner device software drivers).

FIG. 2 presents the system according to the present invention. A signal received by a satellite dish 201 if for example passed via four LNBs 202 and in the result four coaxial cables to a UNICABLE switch 203 having four UBs (The UNICABLE switch 203 is in general a device responding to DiSEqC commands). These four UBs are output by the UNICABLE switch 203 into a single coaxial cable 204. This single coaxial cable 204 is input to a number of receivers 205 at home. Each receiver may be assigned one UB. Hence there will be a UB0 receiver to UB3 respectively.

A receiver 205 is shown in more details at the bottom of FIG. 2. The receiver 205 comprises a tuner circuit 208 sending DiSEqC commands via a connected coaxial cable 209. The tuner may provide such DiSEqC commands when an internal DiSEqC command generator 206 generates a DiSEqC command and submits the command to a DiSEqC conflict detector 207, which prior to sending the command generated by the DiSEqC command generator 206 to the tuner 208 shall verify whether there is low or high risk of conflict with another device (such as other user's receivers 205) also sending DiSEqC commands via the coaxial UNICABLE 204.

It can be easily recognized, by one skilled in the art, that the aforementioned method for DiSEqC conflict recognition may be performed and/or controlled by one or more computer programs. Such computer programs are typically executed by utilizing the computing resources of the device. The computer programs can be stored in a non-volatile memory, for example a flash memory or in a volatile memory (or otherwise a non-transitory computer readable medium), for example RAM and are executed by the processing unit. These memories are exemplary recording media for storing computer programs comprising computer-executable instructions performing all the steps of the computer-implemented method according the technical concept presented herein.

While the invention presented herein has been depicted, described, and has been defined with reference to particular preferred embodiments, such references and examples of implementation in the foregoing specification do not imply any limitation on the invention. It will, however, be evident that various modifications and changes may be made thereto without departing from the broader scope of the technical concept. The presented preferred embodiments are exemplary only, and are not exhaustive of the scope of the technical concept presented herein.

Accordingly, the scope of protection is not limited to the preferred embodiments described in the specification, but is only limited by the claims that follow.

In addition, any combination of the appended claims in envisaged in the present application.

The invention claimed is:

1. A method for conflict recognition on DiSEqC protocol, the method comprising the steps of:
   generating (100) a command to be sent to a device responsive to DiSEqC protocol commands (203);
   requesting (108) a tuner (208) to send the command to the device responsive to DiSEqC protocol commands (203);
   after the step of generating (100) the command and prior to the step of requesting (108) the tuner (208) to send the command, executing the following steps:
      sending (101) a ODU_PowerOFF DiSEqC command from the tuner (208) to the device responsive to DiSEqC protocol commands (203);
      verifying whether the ODU_PowerOFF DiSEqC command results in unlocking the tuner (208) and in case it does;
      sending (104) a "ODU_Channel_change" DiSEqC command from the tuner (208) in order to request to retune the device responsive to DiSEqC protocol commands (203) to new parameters;
      assuming (107) lack of conflict in case the tuner (208) is locked (106) according to the requested parameters.

2. The method according to claim 1, characterized in that in case the tuner fails to lock (106) according to the requested parameters, executing another attempt of sending (104) a "ODU_Channel_change" DiSEqC command from the tuner (208) in order to request to retune the device responsive to DiSEqC protocol commands (203) to new parameters.

3. The method according to claim 2, characterized in case the tuner fails to unlock (102), executing another attempt of sending (101) a ODU_PowerOFF DiSEqC command from the tuner (208) to the device responsive to DiSEqC protocol commands (203).

4. System for conflict recognition on DiSEqC protocol, the system comprising:
   a tuner (208) configured to send a DiSEqC command to a device (203) responsive to DiSEqC protocol commands;
   a DiSEqC command generator (206) for generating said DiSEqC command to be provided to the device (203) responsive to DiSEqC protocol commands;
   the system being characterized in that it further comprises:
   a DiSEqC conflict detector (207), receiving the generated DiSEqC command from the DiSEqC command generator (206), the DiSEqC conflict detector (207) being configured to:
      send (101) a ODU_PowerOFF DiSEqC command from the tuner (208) to the device responsive to DiSEqC protocol commands (203);
      verifying whether the ODU_PowerOFF DiSEqC command results in unlocking the tuner (203) and in case it does;
      send (104) a "ODU_Channel_change" DiSEqC command from the tuner in order to request to retune the device responsive to DiSEqC protocol commands (203) to new parameters;
      assume (107) lack of conflict in case the tuner is locked (106) according to the requested parameters, and request (108) the tuner (208) to send the generated DiSEqC command to the device responsive to DiSEqC protocol commands (203).

5. A non-transitory, computer readable medium storing computer-executable instructions performing all the steps of the following method when executed on a computer:
   generating (100) a command to be sent to a device responsive to DiSEqC protocol commands (203);
   requesting (108) a tuner (208) to send the command to the device responsive to DiSEqC protocol commands (203);
   after the step of generating (100) the command and prior to the step of requesting (108) the tuner (208) to send the command, executing the following steps:
      sending (101) a ODU_PowerOFF DiSEqC command from the tuner (208) to the device responsive to DiSEqC protocol commands (203);
      verifying whether the ODU_PowerOFF DiSEqC command results in unlocking the tuner (208) and in case it does;
      sending (104) a "ODU_Channel_change" DiSEqC command from the tuner (208) in order to request to retune the device responsive to DiSEqc protocol commands (203) to new parameters;
   assuming (107) lack of conflict in case the tuner (208) is locked (106) according to the requested parameters.

* * * * *